US009548688B2

(12) United States Patent
Satou et al.

(10) Patent No.: US 9,548,688 B2
(45) Date of Patent: Jan. 17, 2017

(54) MOTOR CONTROL APPARATUS

(71) Applicant: DENSO CORPORATION, Kariya, Aichi-pref. (JP)

(72) Inventors: Takafumi Satou, Kariya (JP); Nobuyori Nakajima, Kariya (JP); Haruo Suzuki, Kariya (JP)

(73) Assignee: DENSO CORPORATION, Kariya, Aichi-pref.

( * ) Notice: Subject to any disclaimer, the term of this patent is extended or adjusted under 35 U.S.C. 154(b) by 0 days.

(21) Appl. No.: 14/974,233

(22) Filed: Dec. 18, 2015

(65) Prior Publication Data
US 2016/0181954 A1 Jun. 23, 2016

(30) Foreign Application Priority Data

Dec. 22, 2014 (JP) .................................. 2014-258894

(51) Int. Cl.
*H02P 21/00* (2016.01)
(52) U.S. Cl.
CPC .................. *H02P 6/28* (2016.02); *H02P 21/22* (2016.02)
(58) Field of Classification Search
CPC .............. H02P 21/00; H02P 6/00; H02P 6/16; H02P 23/12; H02P 6/12; H02P 1/46; H02P 3/18; H02P 23/00; H02P 25/00; H02P 27/00; H02P 27/04
USPC .......................... 318/400.01, 400.02, 400.14, 400.15,318/400.21, 400.22, 568.22, 619, 432, 599, 700,318/721, 727, 799, 800, 801, 805, 490, 374,318/375, 376; 363/21.1, 28, 40, 44, 55, 95, 120, 363/174, 175; 74/388 PS
See application file for complete search history.

(56) References Cited

U.S. PATENT DOCUMENTS

| 2008/0047776 | A1  | 2/2008 | Kobayashi et al. |
| 2008/0067960 | A1* | 3/2008 | Maeda ............... B62D 5/046 318/400.02 |

FOREIGN PATENT DOCUMENTS

JP 2009-136111 A 6/2009

* cited by examiner

*Primary Examiner* — Antony M Paul
(74) *Attorney, Agent, or Firm* — Knobbe, Martens, Olson & Bear, LLP

(57) ABSTRACT

A motor control apparatus operates a power conversion circuit connected between a direct current power source and a motor, which performs mutual conversion between power at the direct current power source and power at the motor in response to a powering operation and a regenerative operation carried out by the motor. The motor control apparatus includes: a voltage command calculator that calculates a voltage command to the power conversion circuit; a suppression gain calculator that calculates a suppression gain such that an absolute value of an estimation value of a power source current or an absolute value of a detection value of the power source current is not more than a target value; and a voltage command suppressor that suppresses a voltage command by multiplying the suppression gain to the voltage command calculated by the voltage command calculator. Additionally, the suppression gain is within a range of 0 to 1.

9 Claims, 8 Drawing Sheets

MOTOR CONTROL APPARATUS

CROSS REFERENCE TO RELATED APPLICATIONS

This application is based on Japanese Patent Applications No. 2014-258894 filed on Dec. 22, 2014, the disclosure of which is incorporated herein by reference.

TECHNICAL FIELD

The present disclosure relates to a motor control apparatus that controls the electrical conduction of a power conversion circuit connected between a direct current power source and a motor.

BACKGROUND

It has been known that a power conversion circuit is connected between a direct current power source and a motor and performs a conversion between the power at the side of the direct power current source and the side of the motor in response to the powering operation and regenerative operation carried out by the motor. When the motor is rotated by the external force, the regenerative current flows from the motor to the power source.

Accordingly, the magnitude of the power source current flowing into the power conversion circuit from the direct current power source affects the balance of payments for power consumption as comparing with the other systems which are using the same direct current power source at the time of driving the motor. For the motor driving system requiring larger power consumption in particular, the restriction of drawing the power source current is required. For example, the apparatus disclosed in the Patent Document 1 restricts the current command value based on the power source voltage and the motor rotational angular speed and restricts power drew from the direct current power source.

The influence caused by a regenerative current changes due to the allowable recharging power of the direct current power source at the time of the regenerative operation carried out by the motor. When the allowable recharging power is relatively lower, the voltage at the side of the power conversion circuit rises due to the regenerative current and may damage, for example, switching elements for configuring the power conversion circuit. The apparatus disclosed, for example, in the Patent Document 2 monitors the voltage at the side of the inverter device (i.e., the power conversion circuit) and stops the driving of the inverter when detecting an abnormal value.

In the configuration for restricting the current command value in response to the power source voltage or the motor rotational angular speed such as the apparatus disclosed in the Patent Document 1, since the relation between the motor rotational angular speed and current restriction value may vary when the motor output properties change, it is possible that the apparatus cannot restrict to a predetermined current (i.e., power) when, for example, the wiring resistance value at the side of the direct current power source changes.

In addition, when the inverter stops driving in case of detecting an abnormal value, the assistive function for lightening the steering force exerted by a driver may not work in, for example, the vehicular electric power steering apparatus such as the apparatus disclosed in the Patent Document 2. As a result, it brings uncomfortable feeling to the driver and inconvenience in steering a vehicle.

[Patent Document 1] JP 2008-049910-A (Corresponding to US 2008/0047776 A1)
[Patent Document 2] JP 2009-136111-A

SUMMARY

It is an object of the present disclosure to provide a motor control apparatus that properly suppresses a power source current when the absolute value of the power source current flowing into a power source circuit between a direct current power source and a power conversion circuit is not less than a target value.

The motor control apparatus according to the present disclosure operates a power conversion circuit connected between a direct current power source and a motor, which performs mutual conversion between power at the direct current power source and power at the motor in response to a powering operation and a regenerative operation carried out by the motor. The motor control apparatus includes: a voltage command calculator that calculates a voltage command to the power conversion circuit; a suppression gain calculator that calculates a suppression gain such that an absolute value of an estimation value of a power source current flowing into a power source circuit arranged between the direct current power source and the power conversion circuit or an absolute value of a detection value of the power source current is not more than a target value which is predetermined; and a voltage command suppressor that suppresses a voltage command by multiplying the suppression gain to the voltage command calculated by the voltage command calculator. In addition, the suppression gain is a value within a range of 0 to 1.

Accordingly, the motor control apparatus according to the present disclosure properly suppress the power source current without having the influence of variation in wiring resistance or without stopping the driving of the power conversion circuit at the time of the powering operation and the regenerative operation carried out by the motor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
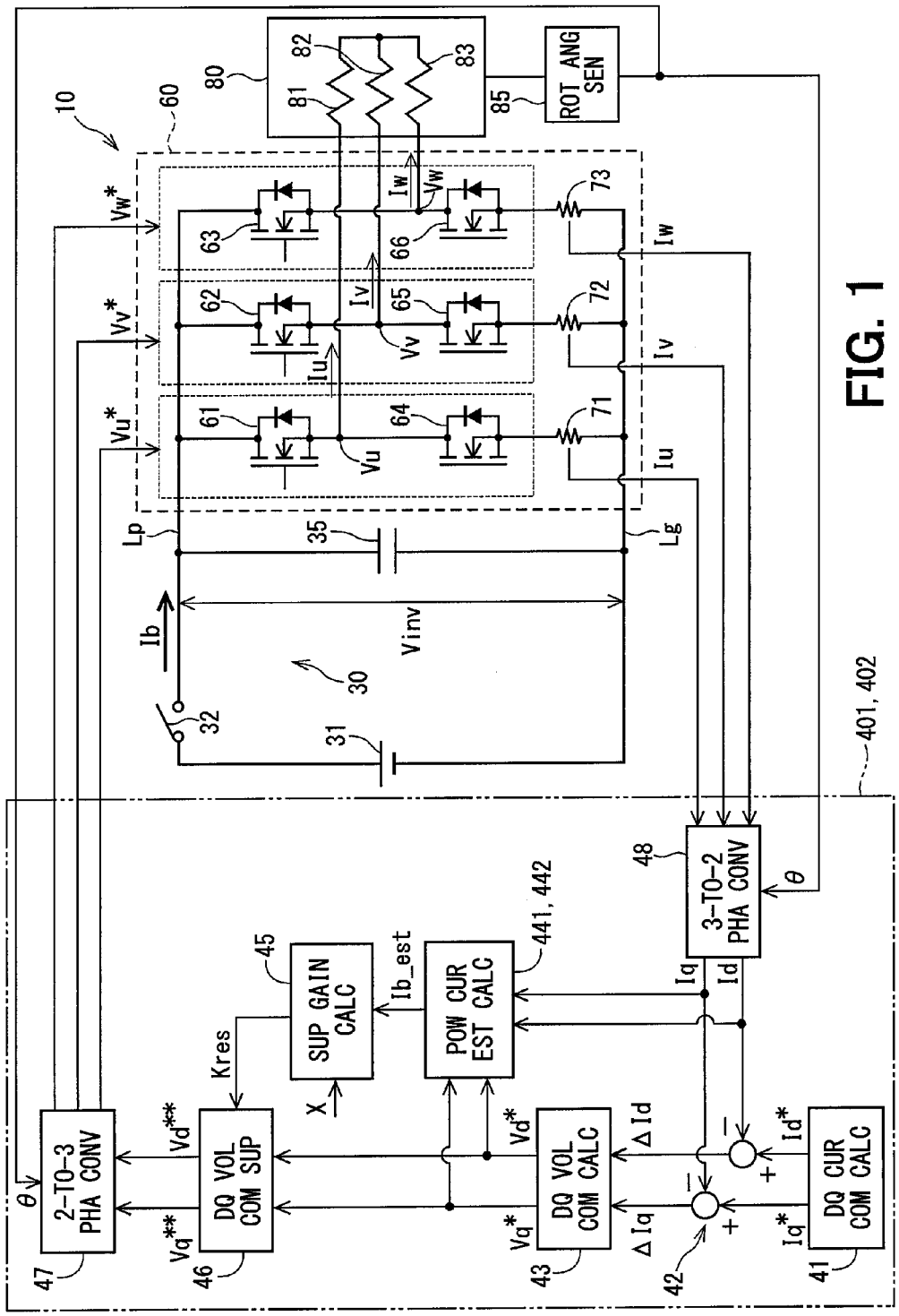
FIG. 1 is a schematic block diagram of a motor control apparatus according to a first embodiment and a second embodiment of the present disclosure.

The following describes a motor control apparatus according to the present disclosure with a plurality of embodiments based on the drawings. The descriptions with regard to the identical configurations appended by the identical reference numerals in the plurality of embodiments are not repeatedly described.

The entire configuration of a motor driving system to which the motor control apparatus according to the present disclosure is applied is described with reference to FIG. 1. For the description with regard to this part, "401" is assigned as the reference numeral for the motor control apparatus. In addition, with regard to the "present embodiment," a first embodiment, a second embodiment, a third embodiment, and a fourth embodiment are included.

A motor driving system 10 includes, for example, a direct current power source 31, an inverter 60, and a motor 80. The motor 80 with regard to the present embodiment is a three-phase brushless motor having three-phase winding sets 81, 82 and 83. The motor 80 is used as a steering assistive motor that assists in the driver's steering in, for example, an electric power steering apparatus in a vehicle. A rotor rotational angle of the motor 80 detected by a rotational angle sensor 85 is converted to an electrical angle θ and is inputted to the motor control apparatus 401.

The direct current power source 31 is a chargeable and dischargeable power storage device within the limit of allowable power. An auxiliary battery is assumed to be included in, for example, the electric power steering apparatus of the vehicle. The auxiliary battery is assumed to provide power to the systems other than the motor driving system 10 for the electric power steering apparatus.

The motor 80 mainly consumes the power provided from the direct current power source 31 to perform a powering operation for outputting a torque, and also performs a regenerative operation through rotation by an input from outside (i.e., a reverse input). This situation corresponds to the case where a wheel at travelling rides over an obstacle and then changes direction or the case where the wheel is jacked up while a handle is operated with regard to, for example, an electric power steering apparatus.

The inverter 60 as a "power conversion circuit" is connected between the direct current power source 31 and the motor 80, and performs power conversion between the power at a side of the direct current power source 31 and the power at a side of the motor 80 in response to the powering operation and the regenerative operation performed by the motor 80. The inverter 60 controls six switching elements 61 to 66, which are connected in a bridge form, to switch on or off according to a command from the motor control apparatus 401.

The switching elements 61, 62 and 63 are at the high potential side having a U-phase, a V-phase and a W-phase respectively. The switching elements 64, 65 and 66 are at the low potential side having a U-phase, a V-phase and a W-phase respectively. MOSFETs are used as the switching elements 61 to 66 in the present embodiment. It is noted that FETs other than MOSFETs or IGBT may be used in other embodiments.

In addition, the present embodiment provides shunt resistors 71, 72 and 73 that detect each of phase currents Iu, Iv and Iw between the switching elements 64, 65, and 66 at the low potential side of each phase and a ground line Lg.

The direct current power provided by the direct current power source 31 is converted to three-phase alternating current power and provided to the motor 80 when the motor 80 performs the powering operation with the driving of the inverter 60. On the other hand, the regenerative current generated by the reverse power of the motor 80 is charged to the direct current power source 31.

The inverter 60 is connected to the positive polarity side of the direct current power source 31 through a power source line Lp, and is connected to the negative polarity side of the direct current power source 31 through the ground line Lg. A capacitor 35 is arranged at the input side of the inverter 60 for smoothing the pulsation of an input voltage.

In this specification, the circuit arranged between the direct current power source 31 and the inverter 60 is called a "power source circuit 30," and the current flowing through the direct current power circuit 30 is called a "power source current Ib." With regard to the positive and negative signs of the power source current Ib, the direction in which the current flows from the direct current power source 31 to the inverter 60 at the time of powering operation is defined as the positive sign, and the direction in which the current flows from the inverter 60 to the direct current power source 31 at the time of regenerative operation is defined as the negative sign. A relay 32 is provided to stop the flow in the power source circuit 30. Moreover, the potential difference between the power source line Lp and the ground line Lg at the input side of the inverter 60 is called an "inverter input voltage Vinv."

The motor control apparatus 401 is configured by, for example, a microcomputer (not shown) and a driving circuit (i.e., a pre-driver). The motor control apparatus 401 computes a voltage command based on a torque signal inputted from outside and feedback signals of the current and electrical angle of the motor 80, and operates each of the switching elements 61 to 66 of the inverter 60 to switch on or off.

For instance, the motor control apparatus 40 and the inverter 60 may be configured by one electronic control unit (i.e., ECU).

For the motor driving system 10 as configured above, when the allowable charging power of the direct current power source 31 is relatively lower, the voltage of the inverter 60 rises due to the regenerative current (i.e., Ib<0) at the time of regenerative operation performed by the motor 80 and hence the switching elements 61 to 66 may be damaged. In addition, when the power source current (i.e., Ib>0) is relatively larger as compared with the allowable discharging power at the time of powering operation performed by the motor 80, the performance of the direct current power source 31 will decline.

The motor control apparatus in each of the embodiments with regard to the present disclosure limits the voltage command to the inverter when the absolute value of the power source current Ib is larger than or equal to the target value such that the power source current Ib is properly limited. In the following section, each of the embodiments describes the particular configuration for limiting the voltage command.

First Embodiment and Second Embodiment

The following describes motor control apparatuses in the first embodiment and the second embodiment with reference to FIGS. 1 to 6. Both of the first and second embodiments are identical in the fundamental configuration, and are different only in the detailed configuration of the power source current estimation calculator. Accordingly, "441" is assigned as the reference numeral for the power source current estimation calculator in the first embodiment, and "442" is assigned as the reference numeral for the power source current estimation calculator in the second embodiment. In addition, "401" is assigned as the reference numeral for the motor control apparatus in the first embodiment having the power source current estimation calculator 441, and "402" is assigned as the reference numeral for the motor control apparatus in the second embodiment having the power source current estimation calculator 442.

Initially, the configuration common to the first and second embodiments will be described with reference to FIGS. 1 and 2. The following uses the reference numerals "401" and "441" in the first embodiment for describing the common configuration.

The motor control apparatus 401 includes a current command calculator 41, a subtractor 42, a d-q axes voltage command calculator 43, a power source current estimation calculator 441, a suppression gain calculator 45, a d-q axes voltage command suppressor 46, a two-to-three phase converter 47 and a three-to-two phase converter 48.

The motor control apparatus 401 uses a well-known vector control to perform a coordinate conversion between a fixed coordinate system (i.e., three-phase) and a rotational coordinate system (i.e., d-q axes two-phase) so as to compute the voltage command applied to the three-phase brushless motor 80. In the following description, "d-q axes current/voltage" is written to include "d-axis current/voltage" and "q-axis current/voltage."

The d-q axes voltage command calculator 43 and the d-q axes voltage command suppressor 46 correspond to the "voltage command calculator" and the "voltage command suppressor" respectively.

The current command calculator 41 instructs the d-axis current command value Id* and the q-axis current command value Iq* based on, for example, a torque signal sent from a torque sensor (not shown).

The subtractor 42 subtracts the d-axis current value Id and the q-axis current value Iq, which are fed back from the three-to-two phase converter 48, from the d-axis current command value Id* and the q-axis current command value Iq* respectively, and computes a d-axis current deviation ΔId and a q-axis current deviation ΔIq.

It is noted that the three-to-two phase converter 48 obtains the electrical angle θ of the motor 80 from the rotational angle sensor 85, and performs a three-to-two phase conversion from three-phase currents Iu, Iv and Iw to the d-axis current Id and the q-axis current Iq.

The d-q axes voltage command calculator 43 computes the d-axis voltage command value Vd* and the q-axis voltage command value Vq* as the values becoming the bases of the voltage command to the inverter 60. This calculation is carries out by, for example, PI (i.e., proportional integral) control calculation such that the d-axis current deviation ΔId and the q-axis current deviation ΔIq converge to zero.

The control calculation for the d-q axes voltage command values Vd* and Vq* is performed at a predetermined control period (for example, 200 μs) in repetition. In this specification, for distinguishing the control calculation value at different times, (n) is appended to the calculation value at the present control calculation (i.e., present value), and (n−1) is appended to the calculation value at the previous process (i.e., previous value).

For an ordinary vector control, the d-q axes voltage command values Vd* and Vq* are directly inputted to the two-to-three phase converter 47. On the other hand, the first embodiment and the second embodiment according to the present disclosure include the power source current estimation calculator 41, the suppression gain calculator 45 and the d-q axes voltage command suppressor 46, and suppress the d-q axes voltage command values Vd* and Vq* based on the situation and subsequently outputs the values to two-to-three phase converter 47.

The power source current estimation calculator 441 computes the estimation value Ib_est of the power source current flowing through the power source circuit 30. With regard to the first and second embodiments in particular, the power source current estimation calculator 441 obtains the d-q axes voltage command values Vd* and Vq* computed by the d-q axes voltage command calculator 43 and the d-q axes current values converted from the phase currents in the three-to-two phase converter 48.

Based on the information, the power source current estimation calculator 441 computes the power source current estimation value Ib_est by using the following mathematical expressions (1) and (2) in relation to the consumption power W of the inverter 60.

$$W = Vd^* \times Id + Vq^* \times Iq \tag{1}$$

$$Ib\_est = W/Vinv \tag{2}$$

The mathematical expressions (1) and (2) will be described later.

The suppression gain calculator 45 compares the absolute value of the power source current estimation value Ib_est to a predetermined target value X. When the absolute value of the power source current estimation value Ib_est is larger than or equal to the target value X, the suppression gain calculator 45 calculates the suppression gain Kres, which is greater than or equal to 0 and less than or equal to 1, such that the absolute value of the power source current estimation value Ib_est becomes less than or equal to the target value X. The suppression gain calculator 45 may store the target value X as a fixed value inside the suppression gain calculator 45, or may obtain the target value from outside.

The d-q axes voltage command suppressor 46 suppresses the d-q axes voltage command values Vd* and Vq* by multiplying the suppression gain Kres to each of the d-q axes voltage command values Vd* and Vq* computed by the d-q axes voltage command calculator 43. Subsequently, the d-q axes voltage command values after suppression Vd and Vq are outputted to the two-to-three phase converter 47.

When Kres is equal to one, the d-q axes voltage command values Vd and Vq after suppression are equal to the d-q axes voltage command values Vd* and Vq* before suppression. In other words, the d-q axes voltage command values Vd* and Vq* computed by the d-q axes voltage command calculator 43 are maintained at the same level. In this specification, suppressing the d-q axes voltage command values Vd* and Vq* also includes the case where both values are maintained at the same level.

Figure 2A:
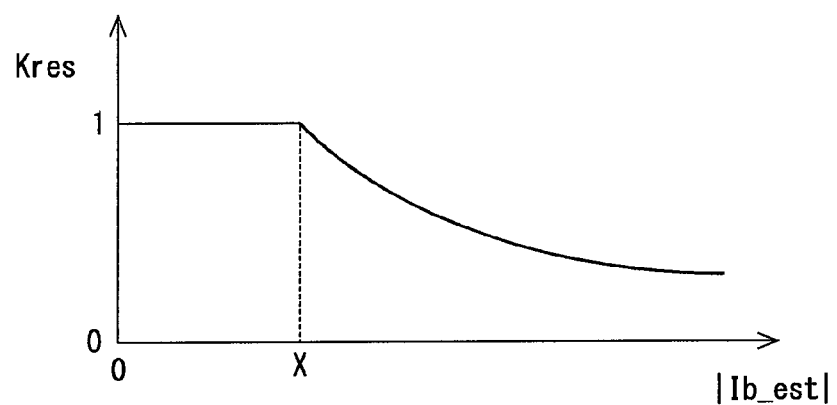
FIG. 2A is a diagram that illustrates mapping showing the relation between a power source current and suppression gain.
Figure 2B:
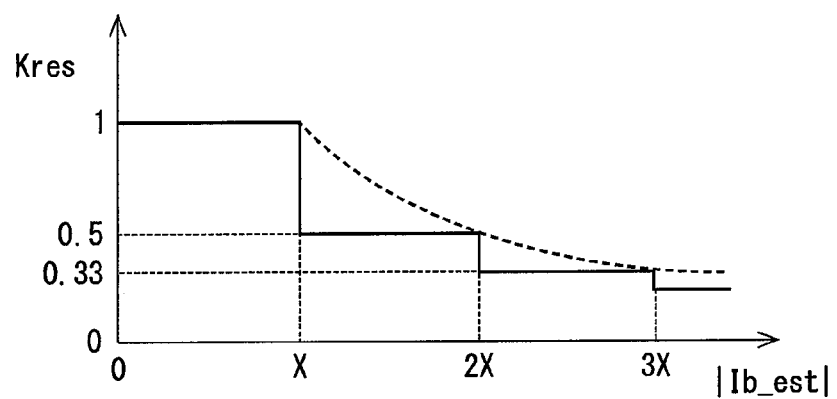
FIG. 2B is a diagram that illustrates a stepwise change of the suppression gain.

The calculation example in which the suppression gain calculator 45 computes the suppression gain Kres is illustrated in FIGS. 2A and 2B.

In the example shown in FIG. 2A, the suppression gain calculator 45 designates a value as the suppression gain Kres obtained by dividing the target value X by the absolute value of the power source current estimation value Ib_est. In other words, the absolute value of the power source current estimation value Ib_set and the suppression gain Kres are in an inverse proportional relation. On the other hand, when the absolute value of the power source current estimation value Ib_est is less than the target value X, the suppression gain Kres is assigned as "1."

With regard to the example illustrated in FIG. 2B, the suppression gain calculator 45 changes the suppression gain Kres in stepwise such that the suppression gain Kres is below the broken line indicative of the inverse proportional curve line illustrated in FIG. 2A. For example, the change in the suppression gain Kres is illustrated below.

Kres=1 is within a range of 0≤|Ib_set|<X;
Kres=0.5 is within a range of X≤|Ib_set|<2X;
Kres=0.33 is within a range of 2X≤|Ib_set|<3X; and
Kres=0.25 is within a range of 3X≤|Ib_set|<4X.

The two-to-three phase converter 47 obtaining the d-q axes voltage command values Vd and Vq after suppression computes the three-phase voltage command values Vu*, Vv* and Vw* by a coordinate conversion based on the electrical angle θ and then outputs the command values to the inverter 60. In a case of the PWM control in particular, with the duty command signal generated based on the voltage command, the switching elements 61 to 66 of the inverter 60 are controlled to switch on or off, and the desirable three-phase alternating current voltage Vu, Vv and Vw are generated. Since the PWM control is a well-known art so that the detailed description is omitted.

The following describes the calculation formula of the power source current estimation value Ib_set calculated by the power source current estimation calculator 441. With regard to the power source circuit 30 and the inverter 60 illustrated in FIG. 1, the relation of "input power=wiring resistance loss+inverter power consumption" exists based on the energy conservation law. When the wiring resistance loss is zero, the mathematical expression (3) based on the total of the product (i.e., power) of the three-phase terminal voltages Vu, Vv and Vw and the currents Iu, Iv and Iw.

$$Vinv \times Ib = Vu \times Iu + Vv \times Iv + Vw \times Iw \tag{3}$$

It is noted that the case of having the wiring resistance loss is described in the other embodiment.

The duty ratio as the ratio of the time duration of an on state to the switching period of the switching elements 61, 62, and 63 at the high potential side is defined by a dimensionless number in a range of zero to one. Since each of the phase terminal voltages Vu, Vv and Vw is equal to the product of the inverter input voltage Vinv and each of the duty ratios DutyU, DutyV and DutyW, the mathematical expression (3) can be written as the mathematical expression (4.1).

$$Ib = DutyU \times Iu + DutyV \times Iv + DutyW \times Iw \tag{4.1}$$

The mathematical expression (4.1) implies that the power source current is evaluated from the product of each phase duty ratio and the current. Similar to the case of the d-q axes two phases, the right hand side of the mathematical expression (4.1) can be expressed as the mathematical expression (4.2) by using the reference voltage Vinv_ref of the inverter input voltage.

$$Ib \approx (Vd \times Id + Vq \times Iq)/Vinv\_ref \tag{4.2}$$

Accordingly, when the voltage commands Vd* and Vq* are used as the d-q axes Vd and Vq for expressing the consumption power W, the power source current estimation Ib_set can be estimated by the mathematical expressions (1) and (2).

The above description states the configurations common in the first and second embodiments.

Next, the following describes: the difference in the both configurations of the power source current estimation calculators 441, 442 with regard to the first and second embodiments respectively; and the difference in the voltage command suppression processes carried out by the motor control apparatuses 401 and 402 with regard to the first and second embodiments respectively.

Figure 3:
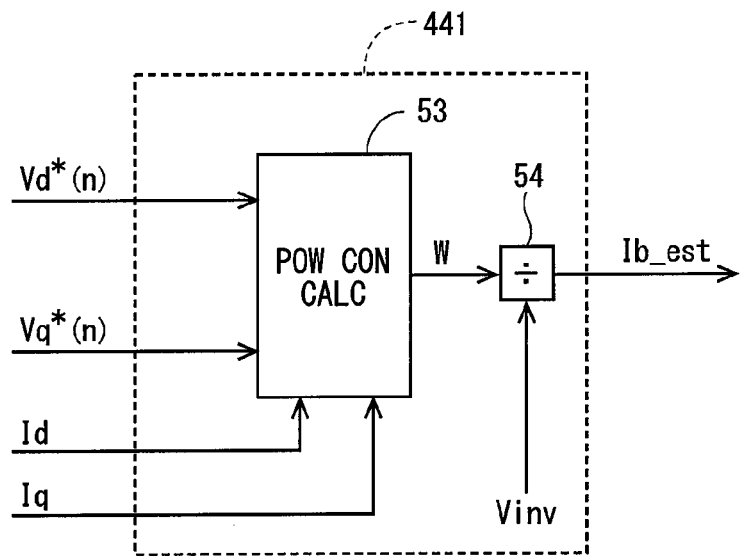
FIG. 3 is a detailed block diagram that shows a power source current estimation calculator according to the first embodiment of the present disclosure.

The configuration of the power source current estimation calculator 441 with regard to the first embodiment is described with reference to FIG. 3. The power source current estimation calculator includes a power consumption calculator 53 and a divider 54. The present value Vd*(n) and Vq*(n) of the d-q axes voltage command outputted at the present control calculation by the d-q axes voltage command calculator 43 and the d-q axes current values Id and Iq are inputted into the power consumption calculator 53. The power consumption calculator 53 uses the mathematical expression (1.1) obtained by substituting Vd*=Vd*(n) and Vq*=Vq*(n) in the above mathematical formula (1) to calculate the power consumption W of the inverter 60.

$$W = Vd^*(n) \times Id + Vq^*(n) \times Iq \tag{1.1}$$

The divider 54 uses the mathematical expression (2) to calculate the power source current estimation value Ib_est obtained by dividing the power consumption W by the inverter input voltage Vinv.

$$Ib\_est = W/Vinv \tag{2}$$

For the inverter input voltage Vinv in the mathematical expression (2), it is assumed to ordinarily use the reference voltage Vinv_ref stored as a default value inside the d-q axes voltage command calculator 43. However, in the third embodiment described later, the inverter input voltage Vinv detected by a voltage sensor 34 may be obtained.

Figure 4:
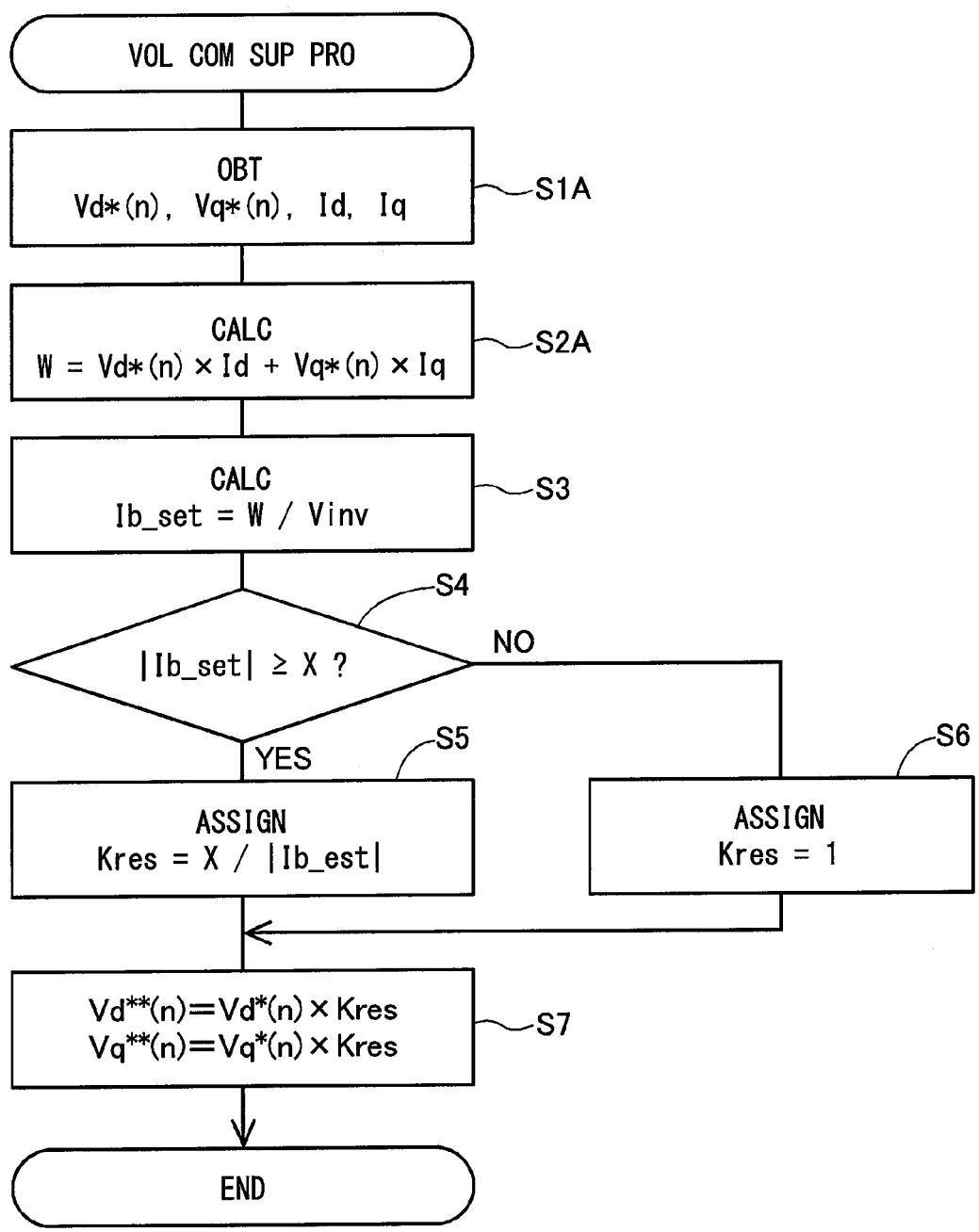
FIG. 4 is a flowchart that shows a voltage command suppression process according to the first embodiment of the present disclosure.

The voltage command suppression process executed by the motor control apparatus 401 according to the first embodiment refers to the flowchart illustrated in FIG. 4. The symbol "S" in the description of the flowchart means the step. Step S1A and step S2A with the symbol "A" appended to the end word of the description of the flowchart are the steps that are different from the one in the after-mentioned second embodiment.

Step S1A to step S3 are executed by the power source current estimation calculator 441. S4 to S6 are executed by the suppression gain calculator 45. S7 is executed by the d-q axes voltage command suppressor 46.

The power consumption calculator 53 in the power source current estimation calculator 441 obtains the present value Vd*(n) and Vq*(n) of the d-q axes voltage command and the d-q axes current values Id and Iq in step S1A.

The power consumption calculator 53 then uses the mathematical expression (1.1) to calculate the power consumption W of the inverter 60 based on the sum value of the "product of the d-axis voltage command Vd*(n) and the d-axis current Id" and the "product of the q-axis voltage command Vq*(n) and the q-axis current Iq" in step S2A.

$$W = Vd^*(n) \times Id + Vq^*(n) \times Iq \tag{1.1}$$

The divider 54 calculates the power source current estimation value Ib_set obtained through dividing the power consumption W by the inverter input voltage Vinv with the use of the mathematical expression (2) in step S3.

$$Ib\_set = W/Vinv \quad (2)$$

The suppression gain calculator 45 performs a comparison between the absolute value of the power current estimation value Ib_set and the target value X in step S4. When the absolute value of the power current estimation value Ib_set is larger than or equal to the target value X (i.e., S4: YES), then the suppression gain calculator 45 assigns the value obtained through dividing the target value X by the power current estimation value Ib_est as the suppression gain Kres in step S5.

$$Kres = X/|Ib\_est| \quad (5)$$

On the other hand, the absolute value of the power current estimation value Ib_set is less than the target value X (i.e., S4: NO), the suppression gain Kres is set to "1" in step S6.

The d-q axes voltage command suppressor 46 calculates the d-q axes voltage command $Vd^{}(n)$ and $Vq^{}(n)$ after suppression obtained through multiplying the suppression gain Kres to each of the d-q axes voltage command values $Vd^*(n)$ and $V^*q(n)$ with the use of the mathematical expressions (6.1) and (6.2) in step S7 and outputs the results to the two-to-three phase converter 47.

$$Vd^{**}(n) = Vd^*(n) \times Kres \quad (6.1)$$

$$Vq^{**}(n) = Vq^*(n) \times Kres \quad (6.2)$$

Subsequently, the voltage command suppression process in the first embodiment is terminated. The two-to-three phase converter 47 converts the d-q axes voltage commands $Vd^{}(n)$ and $Vq^{}(n)$ after suppression to the three-phase voltage command to drive the inverter 60 by the PWM control.

Since the first embodiment uses the present values $Vd^*(n)$ and $Vq^*(n)$ of the d-q axes voltage command, it is possible to estimate a future power current flowing into the power circuit from the present time.

Figure 5:
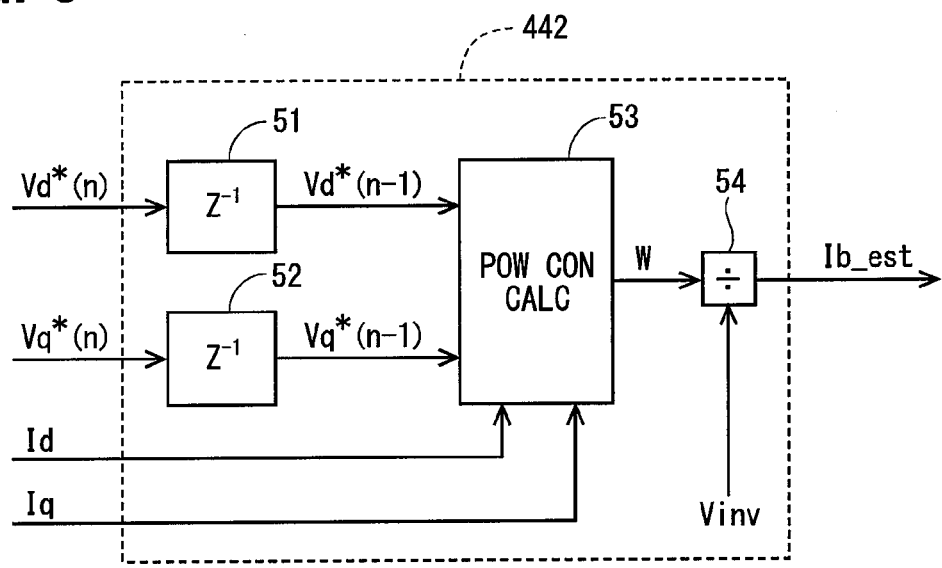
FIG. 5 is a detailed block diagram that shows a power source current estimation calculator according to a second embodiment of the present disclosure.
Figure 6:
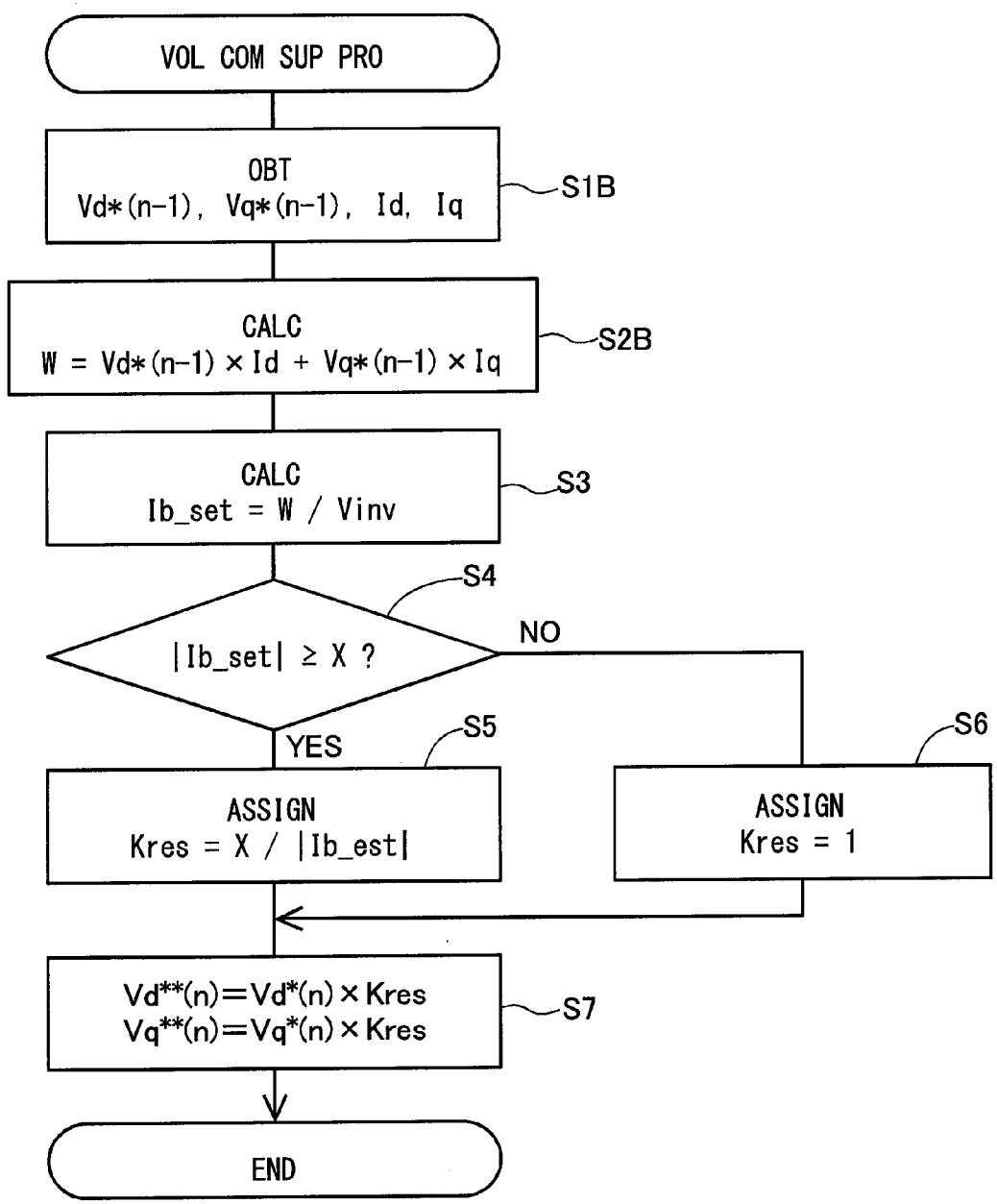
FIG. 6 is a flowchart that shows a voltage command suppression process according to the second embodiment of the present disclosure.

Next, with regard to the configuration of the power source current estimation calculator 442 of the motor control apparatus and the voltage command suppression process in the second embodiment, the following mainly describes the parts different from the one in the first embodiment with reference to FIGS. 5 and 6. The configurations common in FIGS. 3 and 5 and the steps substantially identical in FIGS. 4 and 6 are appended by the identical reference numerals and the identical step symbols. Steps S1B and S2B in FIG. 6 are different from Steps S1A and S2A in FIG. 4, respectively.

As shown in FIG. 5, the power source current estimation calculator 442 in the second embodiment includes delay elements 51 and 52 at the input side of the power consumption calculator 53. The delay elements 51 and 52 delay the control period once in relation to the present values $Vd^*(n)$ and the $Vq^*(n)$ of the d-q axes voltage command $Vq^*$ respectively. The previous values $Vd^*(n-1)$ and $Vq^*(n-1)$ of the d-q axes voltage command outputted by the d-q axes voltage command calculator 43 at the previous control calculation and the d-q axes current values Id and Iq are inputted to the power consumption calculator 53.

For this configuration, the power source current estimation calculator 442 obtains the previous values $Vd^*(n-1)$ and $Vq^*(n-1)$ of the d-q axes voltage command and the d-q axes current values Id and Iq in Step S1B of FIG. 6. In step S2B, with the use of the mathematical expression (1.2) by changing (n) of the mathematical expression (1.1) to (n-1), the power consumption (W) of the inverter 60 is calculated.

$$W = Vd^*(n-1) \times Id + Vq^*(n-1) \times Iq \quad (1.2)$$

The concept in which the suppression gain Kres is computed at step S3 and the steps subsequent to step S3 based on the calculated power consumption W and the suppression gain Kres is multiplied to the d-axis voltage command Vd* and the q-axis voltage command Vq* is similar to the one illustrated in FIG. 4.

In the second embodiment, since the previous values $Vd^*(n-1)$ and $Vq^*(n-1)$ of the d-q axes voltage command are used, the power current flowing into the power circuit can be estimated within the latest past time.

(Effect)

The effects of the motor control apparatuses 401, 402 according to the first embodiment and the second embodiment are described.

(1) In the configuration of limiting the current command value in response to the power voltage or the motor rotational angle speed such as the apparatus described in the Patent Document 1, it is possible that a predetermined current (or power) cannot be limited when the wiring resistance value at the side of the direct current power source changes. In addition, the assistive function for lighten the steering force of a driver may not work in, for example, the vehicular electric power steering apparatus such as the one described in the Patent Document 2 when the driving of the inverter stops in a case of detecting an abnormal value.

In contrast to the above prior arts, the motor control apparatuses 401 and 402 according to the first and second embodiments suppress the d-q axes voltage commands Vd* and Vq* to the inverter 60 such that the absolute value of the power source current estimation value Ib_est is not more than the target value X when the power source current estimation value Ib_est is larger than or equal to the target value X. Accordingly, the power source current Ib can be properly limited when the motor 80 carries out a powering operation and a regenerative operation without having the influence of imbalance in the wiring resistance and without stopping the driving of the inverter 60.

Accordingly, when the allowable charging power of the direct current power source 31 is relatively lower, the damage to the switching elements 61 to 66 due to a rise in the voltage of the inverter caused by the regenerative current (i.e., Ib<0) can be prevented at the time of having the regenerative operation performed by the motor 80. In addition, it is possible that the relative larger current flow (i.e., Ib>0) in relation to the allowable discharging power can be avoided and the performance of the direct current power source 31 can be stabilized at the time of the powering operation performed by the motor 80.

The motor control apparatuses 401 and 402 are particularly effective to be applied to the electric power steering apparatus having the regenerative operation carried out by the motor 80 through an inverse input.

When the power source current estimation value Ib_est is larger than the target value X, as shown in FIGS. 2A and 2B, the suppression gain calculator 45 assigns the "value obtained through dividing the target value X by the absolute value of the power source current estimation value Ib_est" as the suppression gain Kres, the maximum performance can be exerted within an allowable range by setting the suppression gain Kres at the maximum to conform the absolute value of the power source current Ib with the target value X.

(2) The suppression gain calculator 45 according to the first and second embodiments calculates the suppression gain Kres with the use of the estimation value Ib_set without having the detection value of the power source current, the current sensor for directly detecting the power source current Ib is not needed.

(3) The power source current estimation calculators 441 and 442 according to the first and second embodiments calculates the power source current estimation value Ib_set with the use of the present values Vd*(n) and Vq*(n) of the d-q axes voltage command or the previous values Vd*(n−1) and Vq*(n−1). The inner information of the motor control apparatuses 401 and 402 can be effectively used through the calculation with the use of the command value.

Third Embodiment

Figure 7:
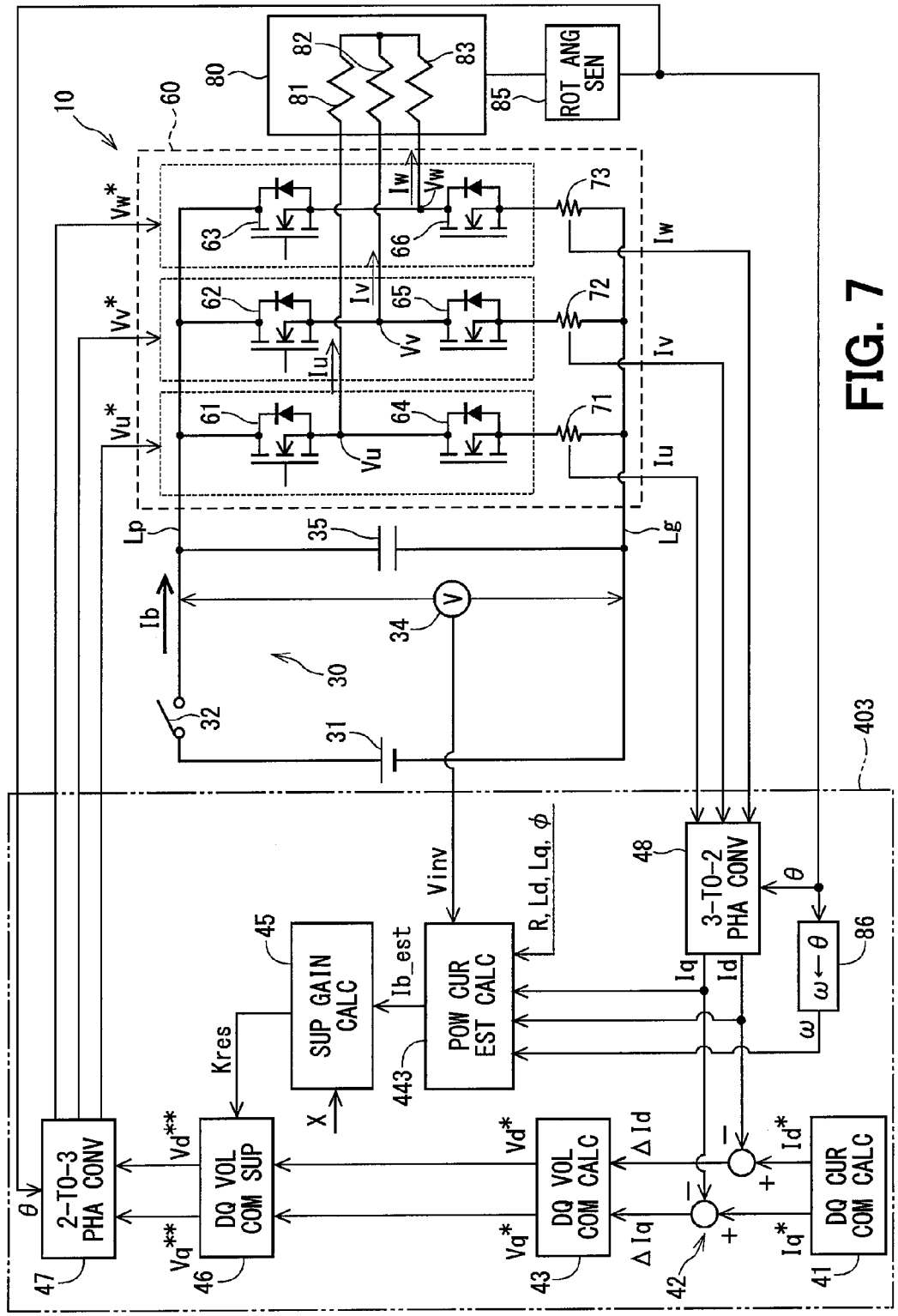
FIG. 7 is a schematic block diagram that shows a motor control apparatus according to a third embodiment of the present disclosure.

A motor control apparatus according to a third embodiment is described with reference to a schematic block diagram illustrated in FIG. 7.

A motor control apparatus 403 according to the third embodiment is different from the first and second embodiments in terms of the method for calculating the power source current estimation value Ib_set carried out by the power source current estimation calculator 443. In addition, a voltage sensor 34 for detecting an inverter input voltage Vinv is arranged in a power source circuit 30.

A d-axis current Id, a q-axis current Iq, and an electrical angular velocity ω obtained by integrating an electrical angle θ over time at a differentiator 86 are inputted to the power source current estimation calculator 443. In addition, the power source current estimation calculator 443 stores an armature resistance R, a d-axis inductance Ld, a q-axis inductance Lq and an armature interlinkage flux (i.e., a back electromotive force constant) φ, which are the circuit constants, inside the power source current estimation calculator 443, or alternatively obtains the circuit constants from outside. The circuit constant can be viewed as a fixed value by ignoring the temperature change or temporal deterioration.

As well known, the voltage equations are represented by the mathematical expressions (7.1) and (7.2) by neglecting the current differential items indicative of a transient state.

$$Vd = R \times Id - \omega \times Lq \times Iq \quad (7.1)$$

$$Vq = R \times Iq - \omega \times Ld' Id + \omega \times \phi \quad (7.2)$$

The power source current estimation calculator 443 calculates the d-axis voltage Vd and the q-axis voltage Vq with the use of the voltage equations based on the d-axis current Id, the q-axis current Iq and the electrical angular speed ω. Subsequently, the power consumption W is calculated as similar in the first and second embodiments based on the d-axis current Id, the q-axis current Iq, the d-axis voltage Vd and the q-axis voltage Vq, and then the power source current estimation value Ib_set is calculated through dividing the power consumption W by the inverter input voltage Vinv. The other configurations are identical to the one in the first and second embodiments.

The third embodiment generates the effects as similar to the effects (1) and (2) in the first and second embodiments as described above.

Fourth Embodiment

Figure 8:
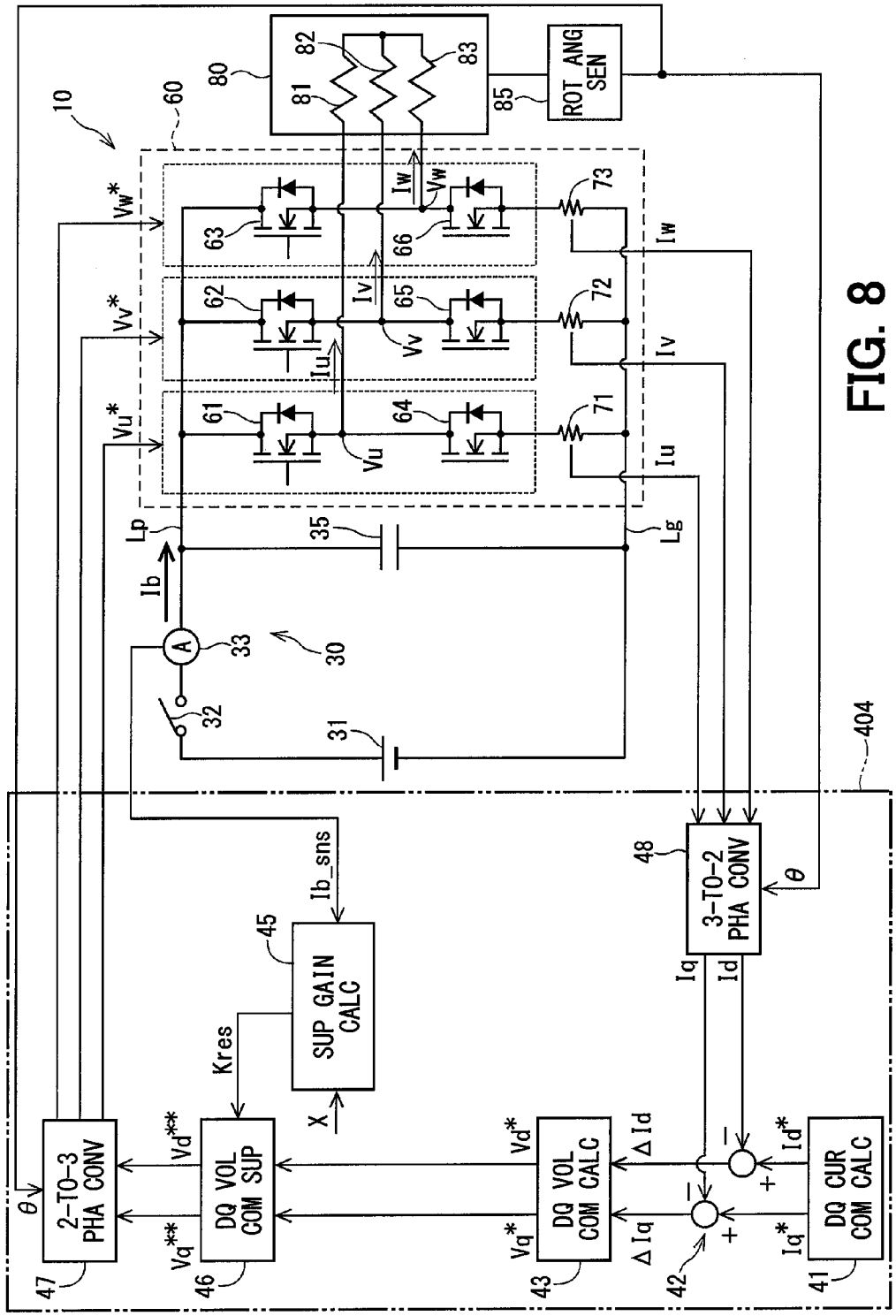
FIG. 8 is a schematic block diagram that shows a motor control apparatus according to a fourth embodiment of the present disclosure.

A motor control apparatus according to a fourth embodiment is described with reference to a schematic block diagram illustrated in FIG. 8.

In the fourth embodiment, a current sensor 33 for directly detecting a power source current Ib is arranged in the power source circuit 30 of the motor driving system 10. The power source current detection value Ib_set and the target value X are inputted to the suppression gain calculator 45 of the motor control apparatus 404.

When the absolute value of the power source current detection value Ib_set is not less than the target value X, the suppression gain calculator 45 calculates the suppression gain Kres based on the relational expression or mapping in which the power source current estimation value Ib_est is changed to the power source current detection value Ib_sns.

Accordingly, the fourth embodiment generates the effects as similar to the effects (1) and (2) in the first and second embodiments as described above. In addition, since the power source current Ib is directly detected, the change in wiring resistance caused by, for example, temperature change or temporal change can be accurately reflected.

Other Embodiments (A) The motor control apparatus for controlling the electrical conduction of a three-phase brushless motor through the vector control is described in the above embodiments. In addition, the motor control apparatus according to the present disclosure may control the electrical conduction of a four or more multi-phase brushless motor.

In addition, the motor control apparatus according to the present disclosure may be applied to a direct current motor with a brush. In this situation, an H-bridge circuit is used as a power converter. In addition, the direct current voltage value is commanded as a voltage command.

(B) The motor control apparatus according to the present disclosure may be applied to a system provided with a boost converter between the direct current power source and the power converter. In this situation, for the calculation of the power source current based on the power consumption, the boosting ratio may be considered.

(C) The estimation value of the power source current is not restricted to the calculation method described in the above embodiments. The estimation value of the power source current may be calculated by using any kind of mathematical expression or mapping.

(D) The motor control apparatus according to the present disclosure may have a device for determining whether the motor 80 is in a powering operation or a regenerative operation to change the suppression gain Kres in response to either situation.

(E) With regard to the mathematical expression (3), the wiring resistance of the inverter is assumed to be zero, and the voltage across both ends of the capacitor 35 is designated as the inverter input voltage Vinv. In contrast to the above situation, the case of considering the wiring resistance of the inverter 60 is described with reference to FIG. 9.

Figure 9:
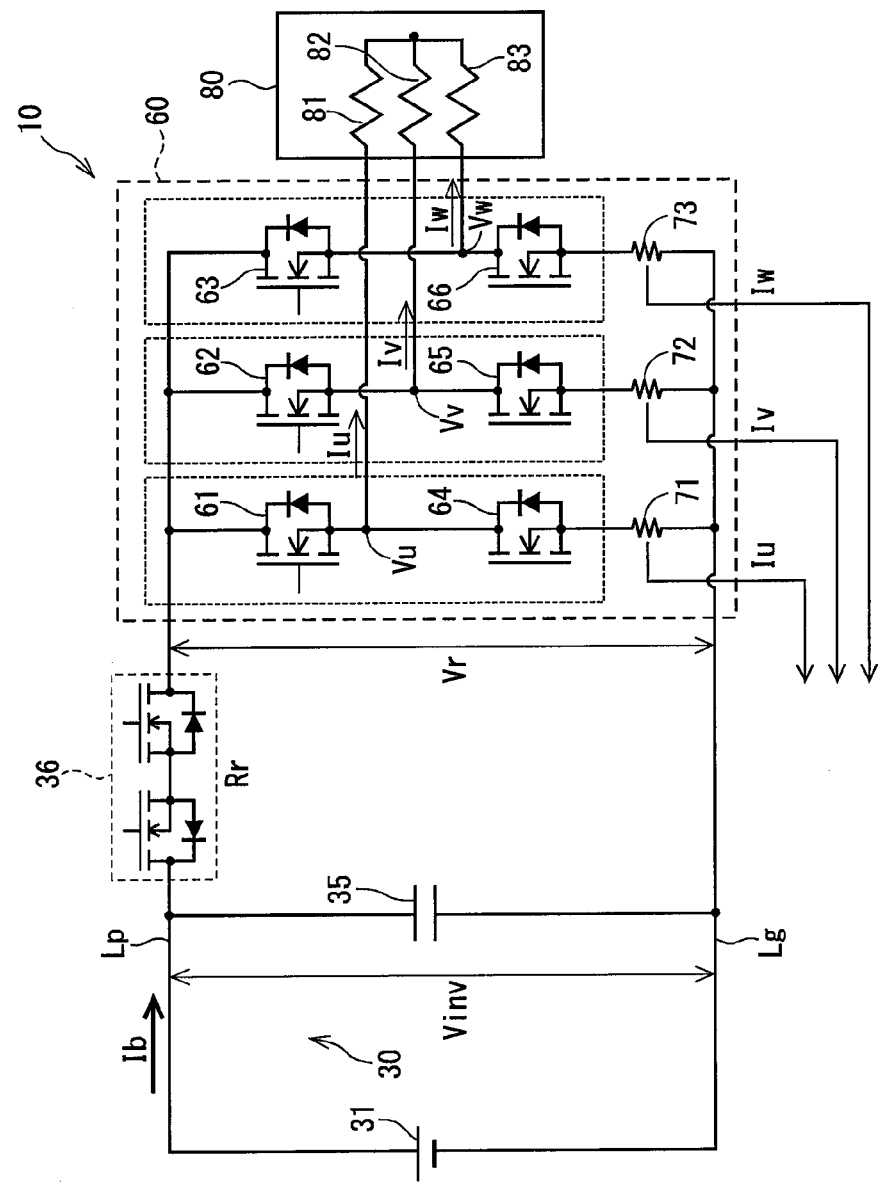
FIG. 9 is a circuit model diagram that illustrates an inverter input voltage in case of considering having wiring resistance.

A semiconductor relay 36 is provided at the input section of the inverter 60 at the right side of the capacitor 35 in the motor driving system illustrated in FIG. 9. The resistance of the semiconductor relay 36 is designated as Rr, and the voltage after the semiconductor relay 36 is designated as Vr, then the relation between Vinv and Vr is represented by the mathematical expression (8).

$$Vinv - Rr \times Ib = Vr \quad (8)$$

Accordingly, the relation between the voltage after the semiconductor relay 36 and each phase terminal voltage is represented by the mathematical expression (9) that corresponds to the mathematical expression (3).

$$Vr \times Ib = Vu \times Iu + Vv \times Iv + Vw \times Iw \quad (9)$$

The mathematical expression (9) is rewritten as the mathematical expression (10) by using the idea of the above mathematical expressions (4.1) and (4.2).

$$Ib = DutyU \times Iu + DutyV \times Iv + DutyW \times Iw \approx (Vd \times Id + Vq \times Iq)/Vinv\_ref \quad (10)$$

The value of the reference voltage Vinv_ref of the inverter input voltage is configured so as to satisfy the mathematical expression (10). Therefore, even if the wiring resistance of the inverter 60 is considered, the power source current Ib can be calculated based on the power consumption W with the use of the reference voltage Vinv_ref.

(F) With regard to the motor control apparatus in the present disclosure, the configurations other than the feature configurations in relation to the voltage command suppression may be properly varied based on prior arts. For example, the three-to-two phase converter 48 is not restricted to the configuration in which three-phase current detection values are obtained from the respective shunt resistors 71, 72 and 73 arranged for the three phases of the inverter 60. It is possible to obtain the current detection values of two phases among three phases and calculate the other one-phase current based on the Kirchhoff law.

(G) The motor control apparatus according to the present disclosure may not only be applied to the motor for an electric power steering apparatus, but may also be applied to the motors with other purposes.

It is noted that a flowchart or the processing of the flowchart in the present application includes sections (also referred to as steps), each of which is represented, for instance, as S1A. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control apparatus for operating a power conversion circuit, which is connected between a direct current power source and a motor and performs mutual conversion between power at the direct current power source and power at the motor in response to a powering operation and a regenerative operation carried out by the motor, the motor control apparatus comprising:
   a voltage command calculator that calculates a voltage command to the power conversion circuit;
   a suppression gain calculator that calculates a suppression gain such that an absolute value of an estimation value of a power source current flowing into a power source circuit arranged between the direct current power source and the power conversion circuit or an absolute value of a detection value of the power source current is not more than a target value which is predetermined; and
   a voltage command suppressor that suppresses a voltage command by multiplying the suppression gain to the voltage command calculated by the voltage command calculator,
   wherein the suppression gain is a value within a range of 0 to 1.

2. The motor control apparatus according to claim 1, wherein, when the absolute value of the estimation value of the power source current or the absolute value of the detection value of the power source current is not less than the target value, the suppression gain calculator assigns a value obtained through dividing the target value by the absolute value of the power source current as the suppression gain.

3. The motor control apparatus according to claim 1, wherein the motor control apparatus controls electrical conduction of a multi-phase brushless motor through a vector control,
   wherein the voltage command calculated by the voltage command calculator and suppressed by the voltage command suppressor includes a d-axis voltage command and a q-axis voltage command.

4. The motor control apparatus according to claim 3, further comprising:
   a power current source estimation calculator that calculates the estimation value of the power source current,
   wherein the suppression gain calculator calculates the suppression gain based on the estimation value of the power source current calculated by the power source current estimation calculator.

5. The motor control apparatus according to claim 4, wherein the power source current estimation calculator calculates a power consumption of the power conversion circuit, and calculates the estimation value of the power source current through dividing the power consumption by an input voltage of the power conversion circuit.

6. The motor control apparatus according to claim 5, wherein the power source current estimation calculator calculates the power consumption of the power conversion circuit based on a sum value of a product of the d-axis voltage command and a d-axis current and a product of the q-axis voltage command and a d-axis current.

7. The motor control apparatus according to claim 6, wherein the power source current estimation calculator calculates the estimation value of the power source current by using a present value of the d-axis voltage command and a present value of the q-axis voltage command outputted at a present control calculation performed by the voltage command calculator.

8. The motor control apparatus according to claim 6, wherein the power current source estimation calculator calculates the estimation value of the power source current by using a previous value of the d-axis voltage command and a previous value of the q-axis voltage command outputted at a previous control calculation performed by the voltage command calculator.

9. The motor control apparatus according to claim 6, wherein the d-axis current and the q-axis current are values obtained by performing d-q conversion on a current detection value flowing into each phase of the multi-phase brushless motor.

* * * * *